(12) United States Patent
Srinivasan et al.

(10) Patent No.: US 7,073,078 B2
(45) Date of Patent: Jul. 4, 2006

(54) POWER CONTROL UNIT THAT PROVIDES ONE OF A PLURALITY OF VOLTAGES ON A COMMON POWER RAIL

(75) Inventors: Karthigan Srinivasan, Houston, TX (US); Joseph P. Miller, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 230 days.

(21) Appl. No.: 10/734,855

(22) Filed: Dec. 12, 2003

(65) Prior Publication Data

US 2005/0132236 A1    Jun. 16, 2005

(51) Int. Cl.
*G06F 1/26*    (2006.01)
(52) U.S. Cl. .................... 713/300; 710/16; 710/301
(58) Field of Classification Search ............ None
See application file for complete search history.

(56) References Cited

U.S. PATENT DOCUMENTS

| | | | | |
|---|---|---|---|---|
| 5,613,130 A | * | 3/1997 | Teng et al. ................. | 713/300 |
| 5,911,050 A | * | 6/1999 | Egan et al. ................. | 710/100 |
| 6,052,742 A | * | 4/2000 | Kirinaka et al. ............. | 710/10 |
| 6,149,139 A | * | 11/2000 | Holderle ...................... | 261/35 |
| 6,792,553 B1 | * | 9/2004 | Mar et al. .................... | 713/330 |

\* cited by examiner

*Primary Examiner*—Ilwoo Park

(57) ABSTRACT

A system comprises a bridge, a slot coupled to the bridge, and a power control unit coupled to the slot via a common power rail and coupled to the bridge. An add-in card having one of a plurality of types can be installed in the slot. Upon installing the add-in card, the bridge determines the type of add-in card and asserts a logic signal to the power control unit. Based on the logic signal, the power control unit provides one of a plurality of direct current ("DC") voltages on the common power rail to the slot.

19 Claims, 3 Drawing Sheets

POWER CONTROL UNIT THAT PROVIDES ONE OF A PLURALITY OF VOLTAGES ON A COMMON POWER RAIL

BACKGROUND

Some computer systems may permit "add-in" cards to be installed into one or more available "slots" in the system. An add-in card may perform any one of a variety of functions such as providing extra memory, providing network connectivity, and providing a graphics accelerator. Add-in cards usually receive power from the system in which the cards are installed. Some add-in cards, however, may require one operating voltage, while other cards may require a different voltage.

BRIEF SUMMARY

In accordance with at least some embodiments of the invention, a system comprises a bridge, a slot coupled to the bridge, and a power control unit coupled to the slot via a common power rail and coupled to the bridge. An add-in card may having one of a plurality of types can be installed in the slot. Upon installing the add-in card, the bridge determines the type of add-in card and asserts a logic signal to the power control unit. Based on the logic signal, the power control unit provides one of a plurality of direct current ("DC") voltages on the common power rail to the slot.

BRIEF DESCRIPTION OF THE DRAWINGS

For a detailed description of some embodiments of the invention, reference will now be made to the accompanying drawings in which.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to." Also, the term "couple" or "couples" is intended to mean either an indirect or direct electrical connection. Thus, if a first device couples to a second device, that connection may be through a direct electrical connection, or through an indirect electrical connection via other devices and connections. Further, a reference to a specific voltage level (e.g., 0 VDC, 1.5 VDC, 3.3 VDC, 12 VDC) reflects the exact voltage referenced or an approximation to the referenced voltage. The term "rail" may include any suitable type of electrical connectivity such as a wire, a trace on a circuit board, or a layer or a portion of a layer on, or in, a printed circuit board.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
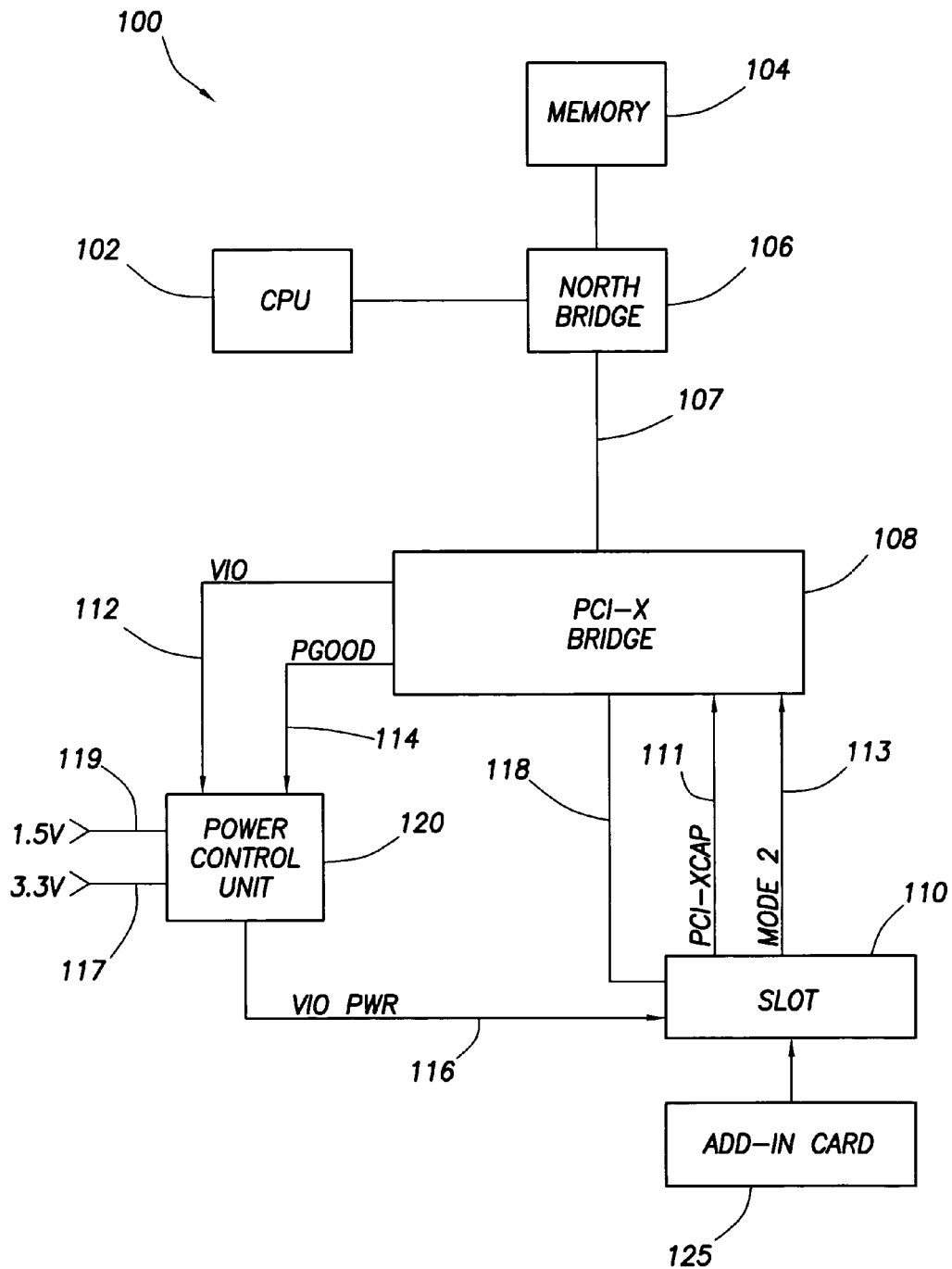
FIG. 1 shows a system comprising a power control unit in accordance with some embodiments of the invention.

FIG. 1 shows a system 100 that may comprise a central processing unit ("CPU") 102, memory 104, a north bridge 106, a bridge 108, a slot 110 and a power control unit 120. The CPU 102 and memory 104 couple to the north bridge 106. The north bridge 106 couples via a bus 107 to bridge 108. In at least some embodiments, bridge 108 may comprise a Peripheral Component Interconnect Extended ("PCI-X") bus bridge. Slot 110 includes a connector to which an add-in card 125 may be installed. As a PCI-X-compliant bridge, bridge 108 provides a PCI-X-compliant bus 118 to the slot 110. As such, PCI or PCI-X-compliant add-in cards may be installed in slot 110. The system 100 may be representative of variety of electronic systems such as a computer system. Other components (not specifically shown) may be included as well.

In accordance with at least some embodiments of the invention, an add-in card 125 that may be installed in slot 110 may receive operating voltage from the power control unit 120. Different types of add-in cards (e.g., PCI, PCI-X mode 1, PCI-X mode 2) may have different voltage requirements. In the embodiment shown in FIG. 1, the power control unit 120 is adapted to provide a plurality of DC voltages to the slot 110 via the VIO PWR power rail 116. Such voltages may comprise a first operating voltage 117 or a second operating voltage 119. Additional or different voltages can be provided as desired depending on the requirements of whatever add-in cards the system is designed to accommodate.

The slot 110 provides logic signals 111 and 113 to the PCI-X bridge 108. Other signals may be provided as well. Signal 111 is a PCI-X capability ("PCIXCAP") signal and specifies whether the add-in card 125 that is installed in slot 110 is PCI-X capable. The PCIXCAP signal 111 may be encoded so that, for example, a logic low ("0") may signify that the add-in card 125 is not PCI-X-compliant and that a logic high ("1") may signify that the add-in card is PCI-X-compliant.

A PCI-X add-in card 125 may be operable in a plurality of modes, for example, "mode 1" and "mode 2." Mode 1 generally permits operation at a first predetermined frequency (e.g., 133 MHz), while mode 2 permits operation at a higher second predetermined frequency (266 MHz). Signal 113 is labeled as "mode 2" and specifies whether the add-in card 125 is mode 2 compliant. As asserted mode 2 signal means that the card is mode 2 compliant, while a deasserted mode 2 card means that the card is mode 1 compliant. Further, a mode 1 card may require a first operating voltage, while a mode 2 card may require a second operating voltage. In accordance with at least some embodiments of the invention, the first operating voltage associated with mode 1 cards may be voltage 117 (e.g., 3.3 VDC), while the second operating voltage associated with mode 2 cards may be voltage 119 (e.g., 1.5 VDC).

Referring still to FIG. 1, during system initialization the PCI-X bridge 108 receives the PCIXCAP and mode 2 signals 111 and 113, respectively. In response, the PCI-X bridge 108 asserts a VIO signal 112 to the power control unit 120. The VIO signal encodes whether the power control unit 120 is to provide voltage 117 (3.3 VDC) or 119 (1.5 VDC)

to the add-in card 125 installed in slot 110. In some embodiments, a logic high for the VIO signal may indicate the presence of a mode 1 (3.3 VDC) add-in card 125. A logic low for the VIO signal may indicate the presence of a mode 2 (1.5 VDC) add-in card. The PCI-X bridge 108 or other suitable logic in the system 100 also may assert a power good ("PGOOD") signal 114 when the power voltage(s) in the system are at an equilibrium state and functional. Armed with information indicating whether the first or second operating voltage 117 or 119 is to be provided to the card and whether the power voltage(s) are equilibrated, the power control unit 120 provides the correct operating voltage on rail 116 to the add-in card 125 in slot 110. As such, rail 116 comprises a common power rail over which one of a plurality of voltages can be provided to a card.

Figure 2:
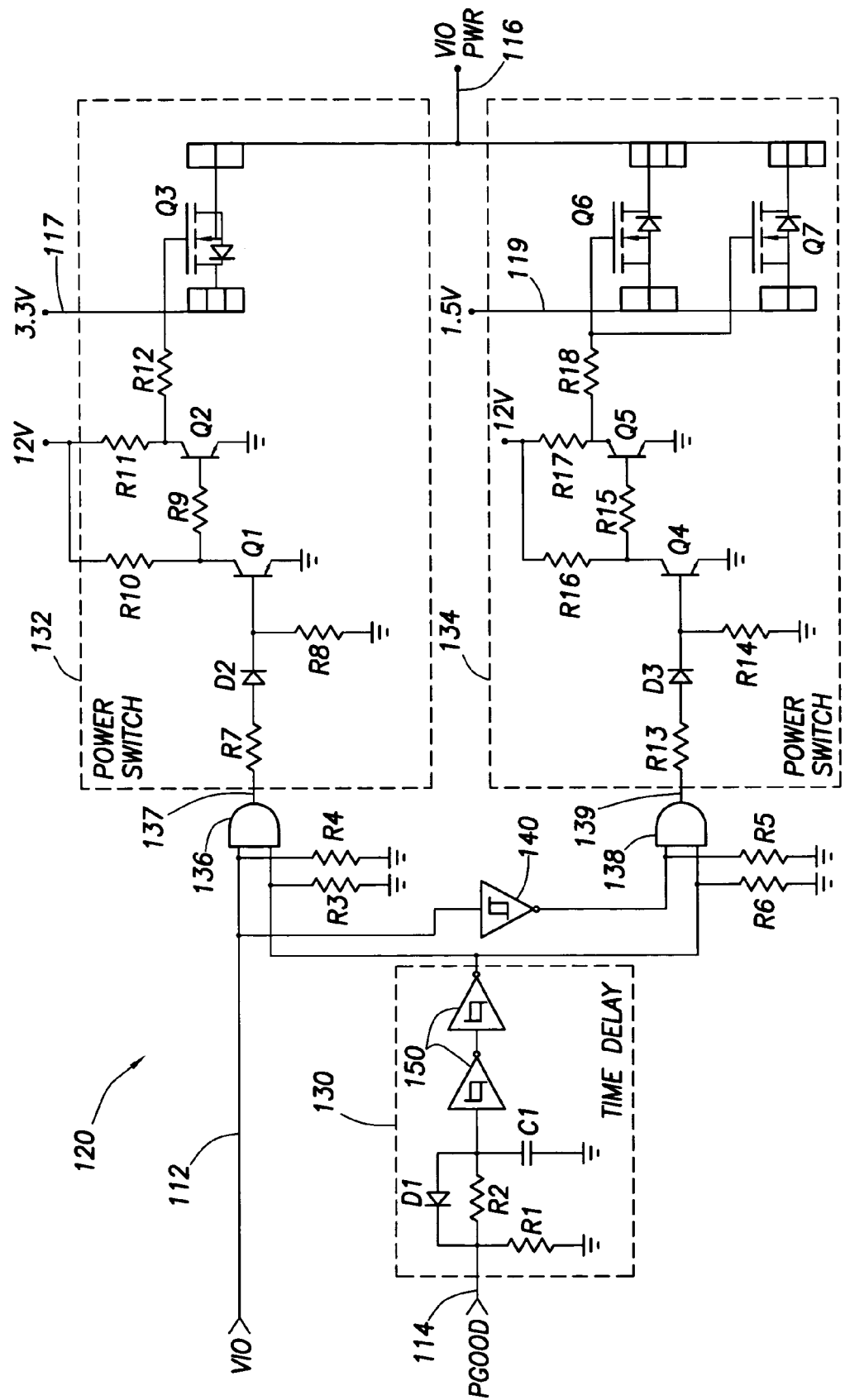
FIG. 2 shows an exemplary implementation of the power control unit of FIG. 1.

Referring now to FIG. 2, an embodiment of the power control unit 120 is shown as comprising a time delay 130, a pair of power switches 132 and 134, a first logic gate 136, a second logic gate 138, and an inverter 140. The logic gates 136 and 138 may comprise AND or other suitable logic gates. The VIO logic signal 112 is provided as an input to each of the logic gates 136, 138. The inverter 140 inverts the VIO logic signal 112 and thus provides an inverted form of the VIO signal to logic gate 138. The PGOOD signal 114 is provided to a time delay 130 and then from the time delay to each of the logic gates 136, 138. The output signals 137 and 139 from the logic gates 136, 138 are asserted high by the respective logic gates when both input signals to each gate are asserted high. The PGOOD signal 114 is asserted high when the bridge determines that the power voltages in the system are at an equilibrium state and functional. As such, the output signal 137 of logic gate 136 is asserted high when the VIO logic signal 112 is asserted high. When the VIO logic signal is high (indicating mode 1 and thus 3.3 VDC is to be provided to the slot's VIO PWR rail 116), the inverter 140 causes the VIO signal to be low as provided to logic gate 138 thereby forcing the output 139 of logic gate 138 to be low. Conversely, when the VIO signal is low (indicating mode 2 and thus 1.5 VDC is to be provided to the slot), the output signal 137 of gate 136 will be low and the output signal 139 of gate 138 will be high.

The time delay 130 comprises resistors R1, R2, C1, diode D1 and a pair of Schmidt triggers 150 coupled together as shown. The time delay 130 implements an RC time constant by resistor R2 and capacitor C1 which slows down the assertion of the PGOOD signal 114 and causes the rising and/or falling edges of PGOOD to change at a slower rate. The Schmidt triggers 150 cause the falling and rising edges of the PGOOD to change at a faster rate as is commonly known.

The resistors R3, R4, R5 and R6 function as pull down resistors on the input signals to gates 136 and 138 to strap the inputs to a ground potential during initialization. These resistors prevent the inputs to gates 136, 138 from floating.

The power switch 132 comprises resistors R7-R11, diode D2, and transistors Q1, Q2 and Q3. Resistor R7 and diode D2 are coupled in series and to the base of transistor Q1. Resistor R8 couples the base of transistor Q1 to a ground potential thereby functions to maintain transistor in an "off" (i.e., non-conducting) state during at least an initial portion of the system initialization. Transistor Q1 couples through resistor R9 to the base of transistor Q2. Resistors R10 and R11 couple transistors Q1 and Q2 to a 12 VDC supply as shown. Transistor R12 couples the collector of transistor Q2 and to the gate of transistor Q3, which may be implemented as a field effect transistor ("FET"). The power switch 134 is configured similarly but may have two output FETs Q6 and Q7 to provide sufficient current capacity to the add-in card. The FET Q3 functions to switch 3.3 VDC voltage onto the common power rail (VIO PWR 116), while FETs Q6 and Q7 function to switch 1.5 VDC voltage onto the power rail.

The operation of the power control unit 120 is as follows. The R8 and R14 pull down resistors force transistors Q1 and Q4 to be off initially (i.e., before the system performs its initialization). As such, all output FETs Q3, Q6 and Q7 are off thereby forcing the voltage on the VIO PWR 116 to be at the ground potential initially. As will be explained below, the power control unit 120 permits either FET Q3 to be on or FETs Q6 and Q7 to be on, but not all three FETs to be on simultaneously. Thus, the power control unit 120 prevents a voltage contention situation from occurring in which FET Q3 would be attempting to force 3.3 VDC onto VIO PWR 116 at the same time FETs Q6 and Q7 are attempting to force 1.5 VDC onto VIO PWR 116.

The operation of the power control unit 120 now will be explained when the VIO signal 112 transitions from the logic low (0) to logic high (1) states thereby indicating that the add-in card should be operated as a mode 1 card meaning that 3.3 VDC is to be provided on the VIO PWR rail 116. When the VIO signal 112 transitions from 0 to 1,the output signal 137 of logic gate 136 changes from logic 0 to logic 1. In response, transistor Q1 turns on and transistor Q2 turns off by action of transistor Q1. Once Q2 is off, the gate input of transistor Q3 transitions from 0 VDC to 12 VDC, thereby turning on transistor Q3. With transistor Q3 on, 3.3 VDC is provided on the common power rail (VIO PWR 116).

With VIO at the logic 1 state, the output signal from inverter 140 is 0 thereby causing output signal 139 from logic gate 138 to be low and forcing transistor Q4 to be off. With transistor Q4 off, transistor Q5 turns on thereby forcing transistors Q6 and Q7 to remain off. As such, only the 3.3 VDC voltage through transistor Q3 (not the 1.5 VDC voltage via transistors Q6 and Q7) is provided on VIO PWR 116.

The operation of the power control unit 120 now will be explained when the VIO signal 112 transitions from the logic high to low states thereby indicating that the add-in card should be operated as a mode 2 card meaning that 1.5 VDC is to be provided on the VIO PWR rail 116. When VIO transitions from 1 to 0,the output of inverter 140 transistors from 0 to 1,and the output signal 139 of logic gate 138 changes from logic 0 to logic 1. In response, transistor Q4 turns on and transistor Q5 turns off by action of transistor Q4. Once Q5 is off, the gate inputs of transistors Q6 and Q7 transitions from 0 VDC to 12 VDC, thereby turning transistor on transistors Q6 and Q7. With transistors Q6 and Q7 on, 1.5 VDC is provided on the common power rail (VIO PWR 116).

With VIO at the logic 0 state, the output signal 137 from logic gate 136 is low which causes transistor Q1 to be off. With transistor Q1 off, transistor Q2 turns on thereby forcing transistor Q3 to remain off. As such, only the 1.5 VDC voltage through transistors Q6 and Q7 (not the 3.3 VDC voltage via transistor Q3) is provided on VIO PWR 116.

A variety of components values may be used for the resistors and capacitors depicted in FIG. 2. The values provided in Table 1 below are exemplary only.

TABLE I

Resistor and Capacitor Values

| Component | Value |
| --- | --- |
| R1, R3–R6, R8, R10, R11, R14, R16, R17 | 10 Kohms |
| R2 | 100 Kohms |
| R7, R13 | 3 Kohms |
| R9, R12, R15, R18 | 300 ohms |
| C1 | 0.10 microfarads |

During power down of system 100, the power control unit 120 shuts off power to the slot 110 generally when the power voltages in the system begin to droop (i.e., fall below predetermined threshold levels). Specifically, the power switches 132 and 134 cause the output FETs Q3, Q6 and Q7 to be off when the 12 VDC power drops to a level that precludes the FETs from being kept on. Accordingly, the power control unit 120 ensures safe shutting down of the system in a manner that precludes voltage contention on the VIO power rail 116.

Figure 3:
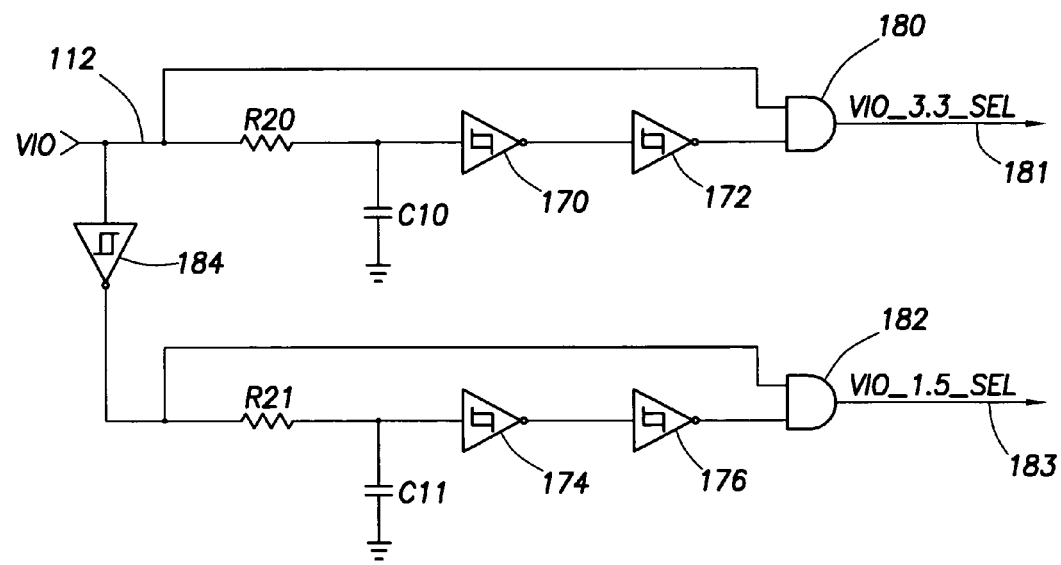
FIGS. 3 and 4 illustrate an embodiment of the invention that supports a hot plug capability.
Figure 4:
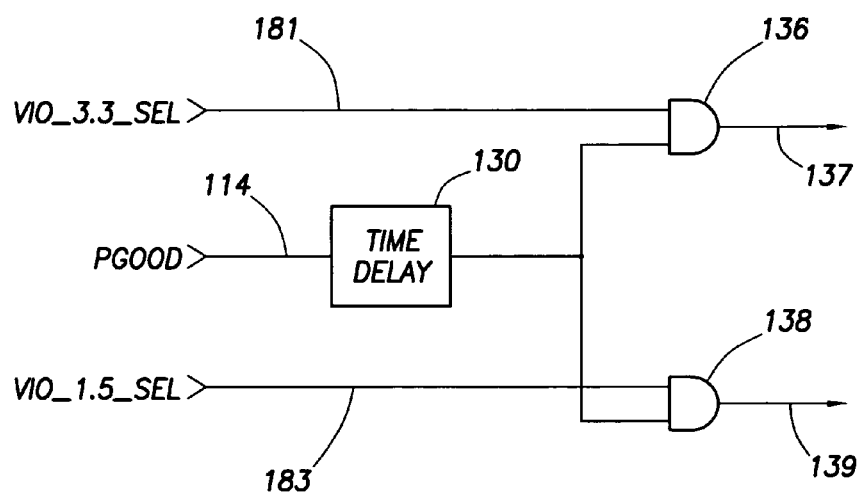

FIGS. 3 and 4 illustrate an embodiment of the invention that supports "hot plug" capability. Hot plug capability permits a card to be removed from or added to a system 100 while the system is otherwise fully operational. FIG. 3 illustrates the creation of two signals, VIO_3.3_SEL 181 and VIO_1.5_SEL 183, based on the VIO signal 112. When asserted, signal VIO_3.3_SEL 181 causes the 3.3 VDC FET Q3 to turn on. Further, when asserted, signal VIO_1.5_SEL 183 causes the 1.5 VDC FETs Q6 and Q7 to turn on. The VIO signal 112 is provided to one input of an AND gate 180 and via resistor R20 and inverters 170 and 172 to another input of AND gate 180. Capacitor C10 couples to the resistor R20 thereby forming an "RC" time delay. Resistor R20 and capacitor C10 may be any suitable values such as 10 kohms and 0.10 microfarads, respectively. The AND gate 180 thus receives the same signal on its inputs, but one input includes a time delay.

The other branch of the circuit shown in FIG. 3 includes an AND gate 182 and is similarly or identically configured to that described. Resistor R21 and capacitor C11 form an RC time delay for the input to the AND gate 182. Inverter 182 causes the VIO signal to be inverted as it is provided to the branch of the circuit comprising the AND gate 182. The inverter 184 generally causes the VIO_3.3_SEL and VIO_1.5_SEL signals 181 and 183 to be at opposite polarities from each other. In general, VIO_3.3_SEL 181 is high when VIO 112 is high and VIO_1.5_SEL is high when VIO 112 is low. The time delays caused by the R20/C10 combination and the R21/C11 combination prevent both the VIO_3.3_SEL and VIO_1.5_SEL signals from being high simultaneously, thereby preventing voltage contention on the VIO power rail 116.

FIG. 4 illustrates a portion of the power control unit 120 with hot plug capability. Specifically, FIG. 4 shows the time delay 130 for the PGOOD signal 114 and the AND gates 136 and 138 as described above. The PGOOD signal, with time delay, is provided as an input to both AND gates 136. The AND gate 136 further receives the VIO_3.3_SEL signal, generated as shown in the exemplary embodiment of FIG. 3, as an additional input. Similarly, the AND gate 138 further receives the VIO_1.5_SEL signal as an additional input. The output signals 137, 139 from gates 136,138 are processed as shown in FIG. 2.

The embodiment of FIG. 4 permits a card to be added to or removed from the slot 110 while the system 100 is in operation. For example, a 3.3 VDC card may be removed from the system and, in its place, a 1.5 VDC card may be installed. Such a change in configuration thus may result in a change in the VIO voltage to the slot 110. The embodiment of FIGS. 3 and 4 will permit this transition to occur without voltage contention on the VIO power rail 116.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a bridge;
   a slot into which an add-in card having one of a plurality of types can be installed, said slot coupled to the bridge; and
   a power control unit coupled to the slot via a common power rail and coupled to the bridge;
   wherein, after installing the add-in card, the bridge determines the type of add-in card installed and asserts a logic signal to the power control unit and wherein, based on the logic signal, the power control unit provides one of a plurality of direct current ("DC") voltages on the common power rail to the slot; and
   wherein the power control unit receives a power good ("PGOOD") signal that indicates whether a power state of the system is functional and the power control unit delays the assertion of the PGOOD signal relative to the logic signal.

2. The system of claim 1 wherein the power control unit delays the assertion of the PGOOD signal relative to the logic signal to permit the logic signal time to equilibrate.

3. The system of claim 1 wherein the plurality of DC voltages comprises 1.5 VDC and 3.3 VDC.

4. The system of claim 1 wherein the power control unit causes the common power rail to be initially at a ground potential during system initialization.

5. The system of claim 4 wherein the power control unit comprises a first power transistor that is adapted to provide a first DC voltage onto the common power rail and a second power transistor that is adapted to provide a second DC voltage onto the common power rail, wherein the first and second transistors are individually selected in response to the logic signal asserted by the bridge.

6. The system of claim 1 wherein the add-in card comprises a PCI-X-compliant card.

7. The system of claim 1 wherein the add-in card can be installed while the system is powered on and operational.

8. A power control unit adapted to be installed in a system and configurable to provide one of a plurality of voltages on a common power rail to a load, comprising:
   a time delay;
   a first power switch that is adapted to provide a first voltage to a load over a power rail;
   a second power switch that is adapted to provide a second voltage to the load on the power rail; and
   wherein the first power switch and the second power switch are responsive to a logic signal specifying whether the first power switch or the second power switch is to provide the first voltage or the second voltage, respectively, on the common power rail to the load; and wherein said time delay delays assertion of a power good signal that indicates whether a power state of the system is functional.

9. The power control unit of claim 8 further comprising:
a first logic gate coupled to the first power switch;
a second logic gate coupled to the second power switch; and
an inverter coupled to the second logic gate;
wherein the logic signal is provided to the first logic gate and to the inverter and wherein the inverter provides an inverted form of the logic signal to the second power switch.

10. The power control unit of claim 9 wherein the time delay is coupled to the first and second logic gates.

11. The power control unit of claim 10 wherein the time delay delays assertion of the power good signal until after the logic signal has had time to equilibrate.

12. The power control unit of claim 8 wherein the power switches cause the voltage on the power rail to be at a ground potential at system initialization.

13. The power control unit of claim 8 wherein, during system power down, the power control unit actively prevents both the first and second power switches from supplying voltage to the common power rail.

14. A system, comprising:
a slot into which an add-in card that comports with one of a plurality of types can be installed, said slot coupled to the bridge;
a bridge that is adapted to determine the type of add-in card installed in the slot;
means for causing a voltage on a power rail to a load to be at a ground potential and for subsequently causing the voltage on the power rail to transition to one of a plurality of voltages depending on the type of add-in card installed in the slot; and
means for delaying assertion of a power state signal relative to a logic signal that specifies to which of the plurality of voltages the voltage on the power rail is to transition.

15. The system of claim 14 wherein the plurality of voltages comprises 1.5 VDC and 3.3 VDC.

16. A method, comprising:
determining a type of card installed in a system;
delaying assertion of a power good signal that indicates whether a power state of the system is functional; and
following the delay of said power good signal, selectively providing one of a plurality of voltages on a single power rail to the card based on the type of card.

17. The method of claim 16 wherein selectively providing one of a plurality of voltages comprises turning on a first power transistor or a second power transistor, the first power transistor configured to provide a first voltage on the power rail and the second power transistor configured to provide a second voltage on the power rail.

18. The method of claim 16 wherein selectively providing one of a plurality of voltages comprises selectively providing either 1.5 VDC or 3.3 VDC.

19. The method of claim 16 further comprising forcing the voltage on the power rail to a ground potential during at least a portion of initialization of the system.

* * * * *